United States Patent
Gajanan et al.

(10) Patent No.: US 12,248,831 B2
(45) Date of Patent: Mar. 11, 2025

(54) SYSTEM AND METHOD FOR FACILITATING PRESENTATION OF SMART CARD DATA TO USERS

(71) Applicant: NXP B.V., Eindhoven (NL)

(72) Inventors: Vinayak Gajanan, Bangalore (IN); Elango Pandiyan Irulandy Gopalakrishnan, Bangalore (IN); Maruthi Konda, Bangalore (IN)

(73) Assignee: NXP B.V., Eindhoven (NL)

( * ) Notice: Subject to any disclaimer, the term of this patent is extended or adjusted under 35 U.S.C. 154(b) by 43 days.

(21) Appl. No.: 18/305,781

(22) Filed: Apr. 24, 2023

(65) Prior Publication Data

US 2024/0289583 A1     Aug. 29, 2024

(30) Foreign Application Priority Data

Feb. 23, 2023   (IN) .............................. 202341012330

(51) Int. Cl.
  *G06K 19/06*      (2006.01)
  *G06K 19/07*      (2006.01)
(52) U.S. Cl.
  CPC ................................ *G06K 19/0723* (2013.01)
(58) Field of Classification Search
  CPC ............. G06Q 20/3552; G06Q 20/341; G06Q 20/346; G06Q 20/3576; G06K 19/073; G06K 19/0723; G06K 19/0719
  USPC ................................................. 235/492, 487
  See application file for complete search history.

(56) References Cited

U.S. PATENT DOCUMENTS

| 7,066,382 B2 * | 6/2006 | Kaplan ..................... G07F 7/12 235/375 |
| 8,118,223 B2 | 2/2012 | Hammad et al. |
| 8,225,386 B1 * | 7/2012 | de Jong ............. G06Q 20/3552 713/184 |
| 2005/0211784 A1 * | 9/2005 | Justin ............... G06Q 20/40145 235/492 |
| 2006/0214005 A1 * | 9/2006 | Agami ................. G06K 19/07 235/492 |
| 2008/0149734 A1 | 6/2008 | Musial et al. |
| 2011/0113473 A1 | 5/2011 | Corda et al. |

(Continued)

FOREIGN PATENT DOCUMENTS

WO        2018207015 A1    11/2018

OTHER PUBLICATIONS

Display Smart Card, available at <<https://www.excelsecu.com/productdetail/esecucarddispl.html>>; Product Information retrieved from the Internet Feb. 24, 2023.

*Primary Examiner* — Daniel St Cyr

(57) ABSTRACT

A smart card including a memory and a domain-specific language (DSL) interpreter is provided. The memory stores card data indicative of a real-time status of one or more attributes of the smart card. The smart card is linked to a service provider and card aggregator circuitry. The card data is stored in a format of the service provider and is updated each time a user of the smart card avails a service of the service provider using the smart card. Further, the DSL interpreter translates the card data to a format of the card aggregator circuitry based on a DSL script and provides the translated card data to the card aggregator circuitry. Based on the translated card data, the real-time status of the one or more attributes of the smart card is presented to the user by way of the card aggregator circuitry.

19 Claims, 8 Drawing Sheets

(56) References Cited

U.S. PATENT DOCUMENTS

| | | | |
|---|---|---|---|
| 2013/0316697 A1* | 11/2013 | Corda | H04W 8/18 455/552.1 |
| 2021/0129452 A1* | 5/2021 | Barbone | G01N 29/041 |
| 2021/0383356 A1 | 12/2021 | Johnson et al. | |

* cited by examiner

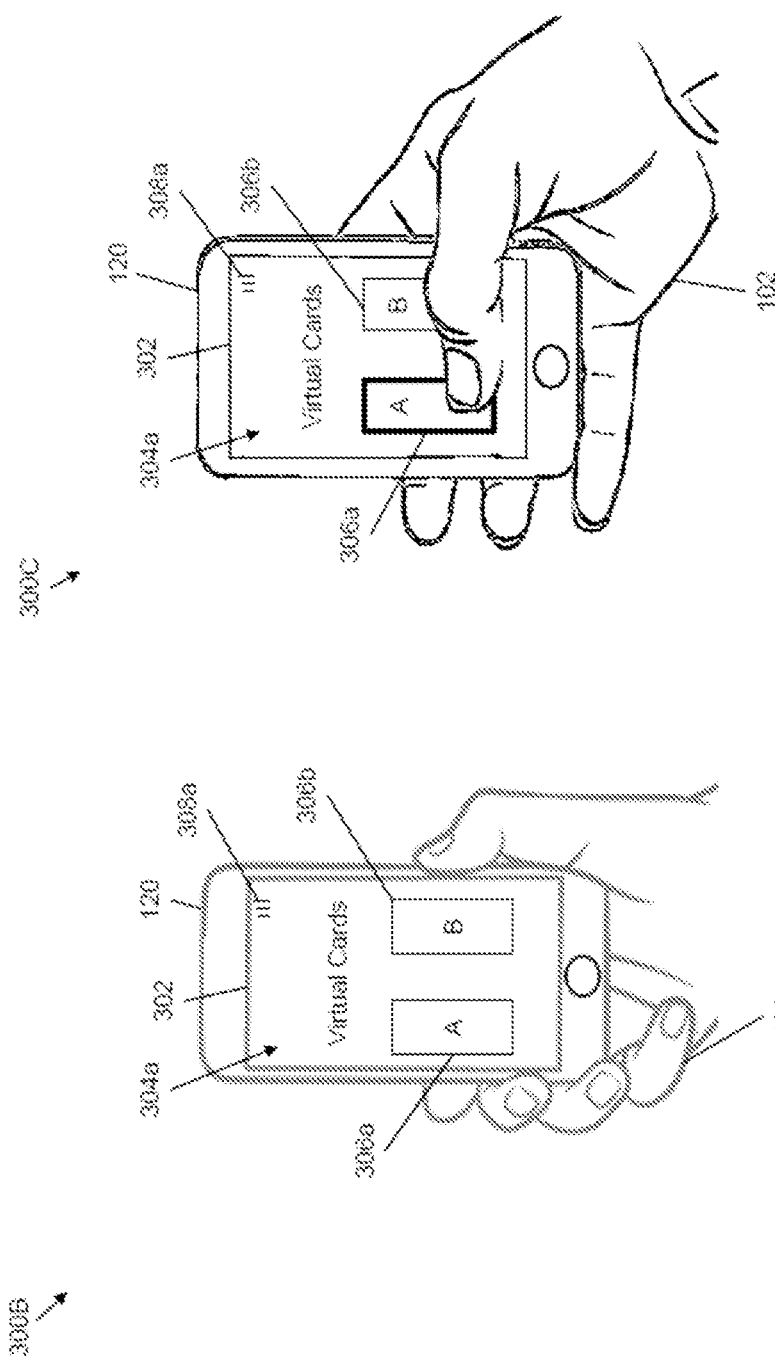

SYSTEM AND METHOD FOR FACILITATING PRESENTATION OF SMART CARD DATA TO USERS

CROSS-REFERENCE TO RELATED APPLICATIONS

This application claims the priority under 35 U.S.C. § 119 of India patent application No. 202341012330, filed on Feb. 23, 2023, the contents of which are incorporated by reference herein.

FIELD OF THE DISCLOSURE

The present disclosure relates generally to electronic circuits, and, more particularly, to a system and a method for facilitating the presentation of smart card data to users.

BACKGROUND

Smart cards are portable devices that are employed in multiple application areas (e.g., public transportation, financial transactions, user authentication, or the like). The smart cards are issued to users by service providers (e.g., city metros, banks, libraries, hotels, or the like) to enable the users to avail various services thereof. Various types of information (e.g., user credentials, transaction data, or the like) are stored in the smart card, and when each service is availed, the card data is updated. Typically, if a user has to view the card data, the user is required to use the physical infrastructure (e.g., a fare collection terminal of a city metro) of a service provider. Further, the user may possess multiple smart cards for different service providers. Thus, to view the card data of each smart card, the user is required to use the infrastructure of the corresponding service provider, which may be cumbersome, thereby resulting in inconvenience to the user.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIGS. 3A-3G are diagrams that illustrate exemplary scenarios in which the smart card data is presented to the user in accordance with an embodiment of the present disclosure;

DETAILED DESCRIPTION

Overview

Figure 1:
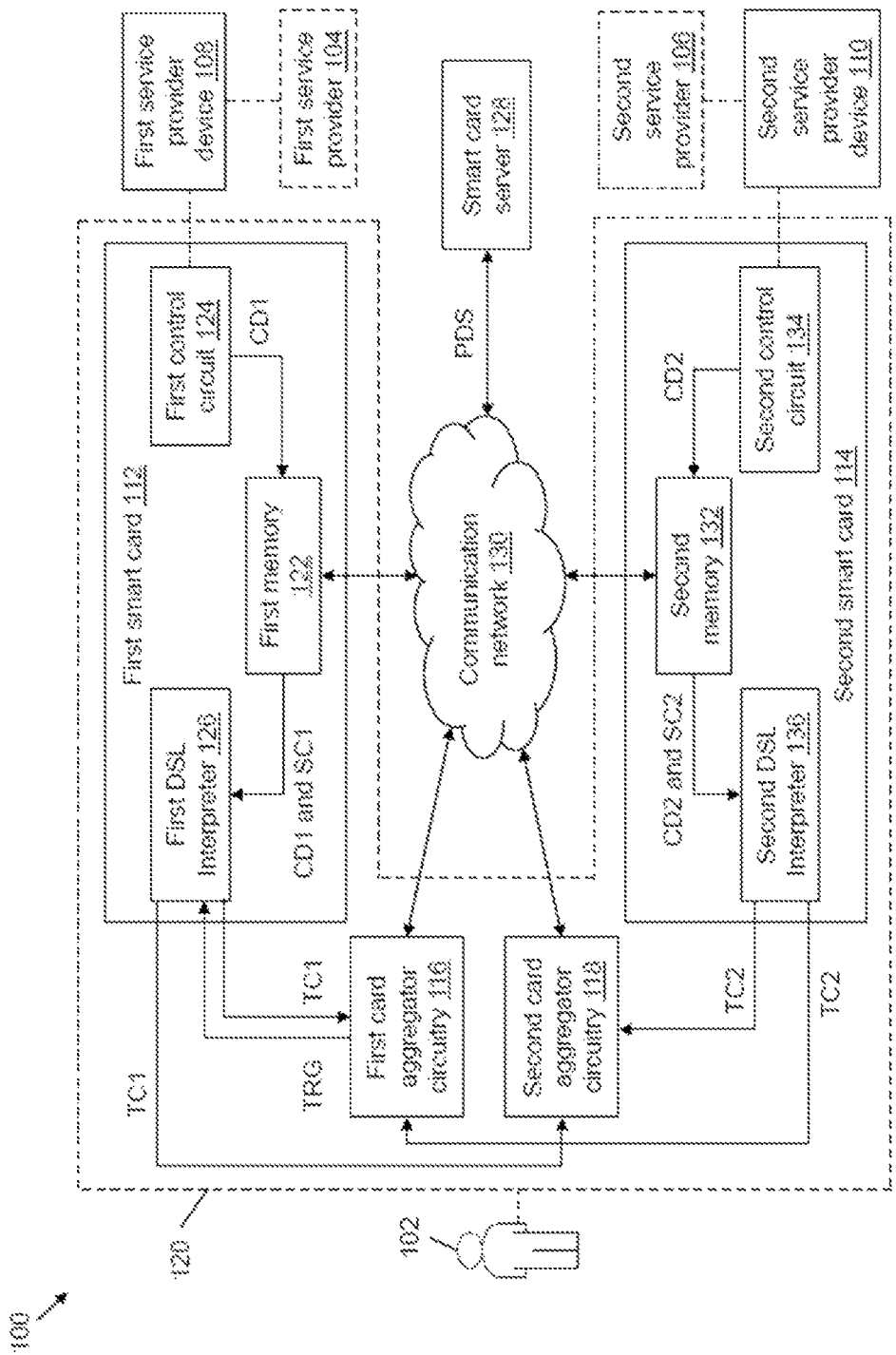
FIG. 1 illustrates a schematic diagram of a smart card environment in accordance with an embodiment of the present disclosure.

Conventionally, a card aggregator aggregates various service providers (e.g., servers of the service providers) linked to a user and presents smart cards (e.g., card data of the smart cards) of all the service providers on a user device of the user. When the user requests for viewing the card data of a smart card, a server of the card aggregator communicates with the server of the corresponding service provider to retrieve the card data stored on the service provider server and presents the retrieved card data to the user on the user device. In such a scenario, the user device is required to be connected to the card aggregator server via the Internet during the entire process, failing which the user may be unable to view the card data. Additionally, the user may experience a delay due to poor internet connectivity or network congestion.

Various embodiments of the present disclosure disclose a system and a method for facilitating the presentation of smart card data to users. Smart cards are portable devices employed in multiple application areas such as public transportation, financial transactions, user authentication, or the like. The smart cards are issued by various service providers to the users to enable the users to avail various services thereof. Examples of the service providers may include city metros, banks, libraries, hotels, or the like. A card aggregator may aggregate multiple smart cards of a user and present card data of each aggregated smart card to the user on a user device by way of card aggregator circuitry included in the user device. Thus, a smart card is linked to at least one service provider and at least one card aggregator circuitry.

The smart card may include a memory to store the card data indicative of a real-time status of one or more attributes of the smart card. The one or more attributes of the smart card may include user data, details of a current transaction, balance information, transaction history, reward point information, accessible zones in an establishment, or the like. The card data is stored in a format of the service provider. Further, the smart card may include a domain-specific language (DSL) interpreter to translate the card data to a format of the card aggregator circuitry. The DSL interpreter may translate the card data in response to the services being availed by the user, a lapse of a periodic time interval, or a user request for viewing the smart card data. The card data is translated based on a DSL script that is generated for data translation from the format of the service provider to the format of the card aggregator circuitry. Further, the DSL interpreter may provide the translated card data to the card aggregator circuitry to facilitate the presentation of the real-time status of the one or more attributes of the smart card to the user. Alternatively, the smart card may be implemented with a presentation circuit (e.g., a display) to present the real-time status of the one or more attributes of the smart card to the user. In such a scenario, the DSL script may be generated for data translation from the format of the service provider to a format that is presentable to the user by way of the presentation circuit.

Thus, in the present disclosure, the DSL interpreter is included in the smart card to translate the smart card data to the format that is presentable to the user. The translation is executed in an offline manner, and the user device of the user is not required to be connected to the Internet to view the smart card data. In other words, the user may view the card data in the absence of network connectivity, and the challenges of poor internet connectivity or network congestion are eliminated. Additionally, as the card data stored in the smart card is directly used for presenting to the user, the data presented to the user is up-to-date. As a result, the user experience of the user is significantly improved as compared to conventional techniques where the card data is fetched from the servers of service providers via the Internet.

FIG. 1 illustrates a schematic diagram of a smart card environment 100 in accordance with an embodiment of the present disclosure. The smart card environment 100 may include a user 102 and a plurality of service providers, of which a first service provider 104 and a second service provider 106 are shown. A service provider may be a company, an organization, an establishment, or the like, that may offer services to the user 102. Examples of the service providers may include city metros, libraries, hotels, banks, or the like. Further, examples of the services offered by the service providers may include city metros offering transportation services, libraries offering book lending services, hotels offering room access, banks offering financial services, or the like.

The service provider may establish infrastructure to offer one or more services to the user 102. The infrastructure may thus implement various functions such as user authentication, transaction authorization, access control, or the like. The infrastructure may include at least one service provider device to regulate the one or more services. In other words, the smart card environment 100 may further include first and second service provider devices 108 and 110 of the first and second service providers 104 and 106 to regulate the services thereof, respectively. Examples of a service provider device may include an access control terminal, a fare collection terminal, a kiosk, a point-of-sale (POS) terminal, or the like.

The user 102 may thus avail the services offered by a service provider (e.g., the first and second service providers 104 and 106) by way of the corresponding service provider device. For example, if the first service provider 104 corresponds to a city metro, the user 102 may be required to pass through a fare collection terminal (e.g., the first service provider device 108) to avail the transportation service offered by the first service provider 104.

The service providers may issue smart cards to the user 102 to enable the user 102 to avail the services thereof at corresponding service provider devices. Thus, the smart card environment 100 may further include a plurality of smart cards that are issued by the plurality of service providers. For example, as shown in FIG. 1, the first and second service providers 104 and 106 may issue first and second smart cards 112 and 114 to the user 102 to enable the user 102 to avail various services at the first and second service provider devices 108 and 110, respectively.

The first smart card 112 may be configured to store first card data CD1 in a secured manner by means of encryption and secure authentication protocols. To avail the services of the first service provider 104, the user 102 may use the first smart card 112 at the first service provider device 108. In such a scenario, the first smart card 112 may be configured to establish a connection with the first service provider device 108, and the first service provider device 108 may be configured to allow or deny the corresponding services to the user 102 based on the first card data CD1.

The first card data CD1 may indicate a real-time status of one or more attributes of the first smart card 112. The one or more attributes of the first smart card 112 may include user data, details of a current transaction, balance information, transaction history, reward points information, accessible zones in an establishment, or the like. The user data may be utilized to authenticate the user 102, whereas the remaining attributes may be associated with the services of the first service provider 104. When a service is successfully availed by the user 102, the first card data CD1 may be updated. For example, when a ticket is purchased at the city metro, the balance information (e.g., the first card data CD1) is updated.

The first smart card 112 may be used as an electronic authentication device and presented to the first service provider device 108 to avail services thereof. The first smart card 112 may operate on a contact interface, a contactless interface, a dual interface, or the like. For the contact interface, the first smart card 112 may be a contact smart card. Examples of the contact smart card may include a magnetic strip smart card, an integrated circuit (IC) chip smart card, or the like. The contact smart card may be required to be inserted or swiped through a contact service provider device to initiate the reading or transferring of the smart card data. Examples of contact service provider devices may include a magnetic strip reader, a chip card reader, or the like. For the contactless interface, the first smart card 112 may be a contactless smart card. Examples of the contactless smart card may include a near-field communication (NFC) smart card, a radio-frequency identification (RFID) smart card, or the like. The contactless smart card may include an IC and an antenna to enable contactless communication with a contactless service provider device. The contactless smart card may be placed near (e.g., less than four centimeters from) the contactless service provider device during a transaction. The contactless service provider device may emit a low-frequency radio signal to power the IC of the contactless smart card and thus enable the reading or transferring of the smart card data. Examples of the contactless service provider device may include an NFC reader, an RFID reader, or the like. For the dual-interface, the first smart card 112 may be a dual-interface smart card that supports both the contact and contactless interfaces and is compatible with both the contact and contactless service provider devices.

The second smart card 114 operates in a similar manner as the first smart card 112, and may be configured to store second card data CD2. The second card data CD2 may indicate a real-time status of one or more attributes of the second smart card 114, and may be utilized at the second service provider device 110 to enable the user 102 to avail the one or more services of the second service provider 106, in the similar manner as described above.

As shown in FIG. 1, the user 102 possesses multiple smart cards (e.g., the first and second smart cards 112 and 114) for multiple service providers (e.g., the first and second service providers 104 and 106). The format in which the card data is stored in each smart card may be different and may be service provider dependent. For example, the first and second card data CD1 and CD2 may be stored in the first and second smart cards 112 and 114 in formats of the first and second service providers 104 and 106, respectively. The formats of the first and second service providers 104 and 106 may correspond to formats that are compliant with the first and second service provider devices 108 and 110 to enable the first and second service provider devices 108 and 110 to read the first and second card data CD1 and CD2, respectively. In such a scenario, to view the smart card data of any smart card, traditionally, a user of the smart card may be required to access the corresponding service provider device, which is cumbersome and inconvenient.

The aforementioned problem is solved by the introduction of a card aggregator that aggregates multiple smart cards linked to a user (such as the user 102) to provide a one-stop solution for the user 102 to view the smart card data of multiple smart cards. For example, a first card aggregator (not shown) aggregates the plurality of smart cards by way of first card aggregator circuitry 116 to enable the presentation of the first and second card data CD1 and CD2 to the user 102. Similarly, a second card aggregator (not shown) aggregates the plurality of smart cards by way of second card aggregator circuitry 118 to enable the presentation of the first and second card data CD1 and CD2 to the user 102. Examples of the first and second card aggregators may include online wallets such as Google Pay™, Apple Pay®, PayPal®, or the like. The user 102 may save each smart card or enter a unique identification number corresponding to each smart card in the card aggregator circuitry to facilitate smart card aggregation. Thus, each smart card is linked to at least one service provider and at least one card aggregator circuitry. For example, the first smart card 112 is linked to the first service provider 104 and the first and second card aggregator circuitries 116 and 118.

The first and second card aggregator circuitries 116 and 118 are installed on a user device 120 of the user 102. Examples of the user device 120 may include smartphones, tablets, wearables, laptops, or the like. The first and second card aggregator circuitries 116 and 118 may correspond to an application, a program, a software tool, or the like. Thus, the first and second card aggregators correspond to the conceptual representation of the online wallets, whereas, the first and second card aggregator circuitries 116 and 118 describe the actual implementation on the user device 120. The user device 120 may additionally include the first and second smart cards 112 and 114 stored thereon. In other words, the first and second smart cards 112 and 114 may be virtual cards. The virtual cards may be implemented in multiple ways. In one embodiment, the first and second smart cards 112 and 114 may correspond to a software development kit (SDK) stored in a secure element of the user device 120. Examples of the secure element may include a sim card, an embedded secure element (eSE), a trusted platform module (TPM), or the like. The secure element may act as a temper-resistant hardware component to securely store the information of the first and second smart cards 112 and 114. In another embodiment, the first and second smart cards 112 and 114 may be simulated on the user device 120.

The first and second smart cards 112 and 114 are illustrated as virtual cards in FIG. 1. However, the scope of the present disclosure is not limited to it. In other embodiments, the first and second smart cards 112 and 114 may be physical smart cards and each of the first and second card aggregator circuitries 116 and 118 may wirelessly communicate with the first and second smart cards 112 and 114.

In the smart card environment 100 of FIG. 1, the smart card data (e.g., the first and second card data CD1 and CD2) is presented to the user 102 on the user device 120 by way of the first card aggregator circuitry 116 and/or the second card aggregator circuitry 118. Multiple card aggregator circuitries are included in the smart card environment 100 to describe that a single user (e.g., the user 102) may use multiple card aggregators for viewing smart card data, with each card aggregator aggregating the smart cards of the user 102. For the sake of brevity, the presentation of the smart card data by way of the first card aggregator circuitry 116 is explained in detail below. The second card aggregator circuitry 118 may be configured to present the real-time status of the first and second smart cards 112 and 114 to the user 102 on the user device 120 in a similar manner, without deviating from the scope of the present disclosure.

The first card data CD1 stored in the first smart card 112 is in the format of the first service provider 104, and the second card data CD2 stored in the second smart card 114 is in the format of the second service provider 106. The first card aggregator circuitry 116 may operate under different protocols, and hence, may not be able to decode the first and second card data CD1 and CD2 directly. To enable the presentation of the first card data CD1 to the user 102 on the user device 120 by way of the first card aggregator circuitry 116, the first smart card 112 may be further configured to translate the first card data CD1 from the format of the first service provider 104 to a format of the first card aggregator circuitry 116. The first card data CD1 is translated based on a first domain-specific language (DSL) script SC1 that is generated for data translation from the format of the first service provider 104 to the format of the first card aggregator circuitry 116. In other words, the first DSL script SC1 is generated for the combination of the first service provider 104 and the first card aggregator circuitry 116 and is utilized to translate the first card data CD1 to a format that is presentable to the user 102. The first card data CD1 may correspond to byte/bit arrays, and the first DSL script SC1 may include built-in functions to extract information from the byte/bit arrays and convert the extracted information to a desired format (e.g., the format of the first card aggregator circuitry 116). Similarly, the second smart card 114 may be further configured to translate the second card data CD2 from the format of the second service provider 106 to the format of the first card aggregator circuitry 116 based on a second DSL script SC2.

The first and second smart cards 112 and 114 may thus generate first and second translated card data TC1 and TC2, respectively. Further, the first and second smart cards 112 and 114 may be configured to provide the first and second translated card data TC1 and TC2 to the first card aggregator circuitry 116. As the first and second translated card data TC1 and TC2 are in the format of the first card aggregator circuitry 116, the first card aggregator circuitry 116 may be further configured to present, to the user 102, the real-time status of the one or more attributes of each of the first and second smart cards 112 and 114 on an output component (shown later in FIGS. 3B-3G) of the user device 120. The real-time status may be presented in a visual form, an audio form, an audio/visual form, a haptic form, or the like. In such a scenario, the output component may correspond to a display unit, an audio unit, an audio/video unit, a haptic unit, or the like.

In the present disclosure, only the translation of the first card data CD1 for presentation by way of the first card aggregator circuitry 116 is explained in detail. However, the second card data CD2 may be translated for presentation by way of the first card aggregator circuitry 116 in a similar manner, without deviating from the scope of the present disclosure. The translation of the first card data CD1 is performed by the first smart card 112. To perform the card data translation, the first smart card 112 may include a first memory 122, a first control circuit 124, and a first DSL interpreter 126.

The first memory 122 may include suitable logic, circuitry, and/or interfaces that may be configured to perform one or more operations. For example, the first memory 122 may be configured to store the first card data CD1 in the format of the first service provider 104. Examples of the first memory 122 may include a random access memory (RAM), a read-only memory (ROM), or the like.

The first control circuit 124 may be coupled to the first memory 122. The first control circuit 124 may include suitable logic, circuitry, and/or interfaces that may be configured to perform one or more operations. For example, the first control circuit 124 may be configured to store the first card data CD1 in the first memory 122. Further, the first control circuit 124 may be configured to communicate with the first service provider device 108 to enable the user 102 to avail the one or more services that are regulated by the first service provider device 108. The communication between the first control circuit 124 and the first service provider device 108 may be implemented in the contact and/or contactless manner as described above. Thus, the first control circuit 124 may correspond to the magnetic strip, the IC chip, or the like, to enable contact-based communication with the first service provider device 108 or may include the IC and the antenna to enable contactless communication with the first service provider device 108. Based on the one or more services being availed by the user 102, the first control circuit 124 may be further configured to update the first card data CD1. As the first card data CD1 is updated every time a service is availed (e.g., after every transaction, access, or the like), the first card data CD1 is up-to-date and indicates the real-time status of the one or more attributes of the first smart card 112.

The first DSL interpreter 126 may be coupled to the first memory 122 and the first card aggregator circuitry 116. The first DSL interpreter 126 may include suitable logic, circuitry, and/or interfaces that may be configured to perform one or more operations. For example, the first DSL interpreter 126 may be configured to retrieve the first card data CD1 from the first memory 122 and translate the first card data CD1 to the format of the first card aggregator circuitry 116. The first translated card data TC1 may be generated (e.g., the first card data CD1 may be translated) based on the first DSL script SC1. Further, the first DSL interpreter 126 may be configured to provide the first translated card data TC1 to the first card aggregator circuitry 116 to facilitate the presentation of the real-time status of the one or more attributes of the first smart card 112 to the user 102. In an embodiment, the first DSL interpreter 126 may be implemented as an applet in the first smart card 112.

The card data translation may be triggered based on different factors. In one embodiment, the card data translation may be triggered based on a user request (shown later in FIG. 2) for the real-time status of the one or more attributes of the first smart card 112. For example, the user 102 may wish to view the real-time status of any attribute (e.g., balance information) of the first smart card 112 and may initiate the user request by way of the first card aggregator circuitry 116. The first card aggregator circuitry 116 may be further configured to generate a status request (shown later in FIG. 2) to obtain the real-time status of the one or more attributes of the first smart card 112. The first DSL interpreter 126 may be further configured to receive trigger information TRG, including the status request, from the first card aggregator circuitry 116. Thus, the first DSL interpreter 126 receives the status request in response to the user request. The first DSL interpreter 126 translates the first card data CD1 and provides the first translated card data TC1 to the first card aggregator circuitry 116 in response to the received status request. In another embodiment, the first DSL interpreter 126 translates the first card data CD1 and provides the first translated card data TC1 to the first card aggregator circuitry 116 in response to the one or more services being availed by the user 102 (e.g., each time a service is availed by the user 102). In such a scenario, the first translated card data TC1 may be stored in a memory element (not shown) of the first card aggregator circuitry 116 and may be presented to the user 102 based on the user request (e.g., when the user 102 initiates the user request). In yet another embodiment, the first DSL interpreter 126 translates the first card data CD1 and provides the first translated card data TC1 to the first card aggregator circuitry 116 at periodic time intervals. In such a scenario, the first translated card data TC1 may be stored in the memory element of the first card aggregator circuitry 116 and may be presented to the user 102 based on the user request.

The first DSL script SC1 utilized for the translation of the first card data CD1 may be identified from a plurality of DSL scripts PDS generated for card data translation. The smart card environment 100 may further include a smart card server 128 and a communication network 130. The smart card server 128 may be coupled to the first and second smart cards 112 and 114 and/or the first and second card aggregator circuitries 116 and 118 by way of the communication network 130. Examples of the communication network 130 may include the Internet, a local area network (LAN), a wide area network (WAN), or the like. The smart card server 128 may include suitable logic, circuitry, and/or interfaces that may be configured to perform one or more operations. For example, the smart card server 128 may be configured to generate the plurality of DSL scripts PDS and store, by way of the communication network 130, the plurality of DSL scripts PDS in the smart cards (e.g., the first and second smart cards 112 and 114) or the card aggregator circuitries (e.g., the first and second card aggregator circuitries 116 and 118).

When the Plurality of DSL Scripts PDS Is Stored in Smart Cards

The first memory 122 may be further configured to store the plurality of DSL scripts PDS. In such a scenario, each DSL script is generated to enable data translation from the format of the corresponding service provider (e.g., the first service provider 104) to a format of one of a plurality of card aggregator circuitries (such as the first and second card aggregator circuitries 116 and 118). Further, the first DSL interpreter 126 may be configured to determine that the first card data CD1 is to be translated to the format of the first card aggregator circuitry 116. The first DSL interpreter 126 may determine that the first card data CD1 is to be translated to the format of the first card aggregator circuitry 116 based on the status request (e.g., the trigger information TRG) received from the first card aggregator circuitry 116. Alternatively, the first DSL interpreter 126 may determine that the first card data CD1 is to be translated to the format of the first card aggregator circuitry 116 based on one or more predefined rules indicating that the card data translation to the format of the first card aggregator circuitry 116 is triggered every time a service of the first service provider 104 is availed by way of the first smart card 112 or on the lapse of the periodic time interval.

The first DSL interpreter 126 may be further configured to identify, from the plurality of DSL scripts PDS, the first DSL script SC1 linked to a combination of the first service provider 104 and the first card aggregator circuitry 116 and retrieve the first DSL script SC1 from the first memory 122. In an embodiment, the first memory 122 may be further configured to store a mapping between the plurality of DSL scripts PDS and the plurality of card aggregator circuitries, and the first DSL script SC1 may be identified from the plurality of DSL scripts PDS based on the mapping. Further, the first card data CD1 is translated based on the identified first DSL script SC1.

When the Plurality of DSL Scripts PDS Is Stored in Card Aggregator Circuitries

The first card aggregator circuitry 116 (e.g., the memory element of the first card aggregator circuitry 116) may be configured to store the plurality of DSL scripts PDS. In such a scenario, each DSL script of the plurality of DSL scripts PDS may be generated to enable data translation from a format of one of the plurality of service providers (e.g., the first and second service providers 104 and 106) to the format of the first card aggregator circuitry 116. In such a scenario, the first card aggregator circuitry 116 may be further configured to determine that the user request is associated with the first service provider 104 and identify, from the plurality of DSL scripts PDS, the first DSL script SC1 linked to the combination of the first service provider 104 and the first card aggregator circuitry 116. In an embodiment, the first card aggregator circuitry 116 (e.g., the memory element of the first card aggregator circuitry 116) may be further configured to store a mapping between the plurality of DSL scripts PDS and the plurality of service providers, and the first DSL script SC1 may be identified from the plurality of DSL scripts PDS based on the mapping. Further, the first DSL interpreter 126 may be configured to receive the first DSL script SC1, in addition to the status request. In such a scenario, the trigger information TRG includes the status request and the first DSL script SC1. The first DSL interpreter 126 receives the status request and the first DSL script SC1 in response to the user request for the real-time status of the one or more attributes of the first smart card 112. The first card data CD1 is translated based on the received first DSL script SC1. In such a scenario, the card data translation may exclusively be triggered based on the user request.

The first card data CD1, the plurality of DSL scripts PDS, and the first translated card data TC1 may be in JavaScript object notation (JSON) format, extensible markup language (XML) format, or the like. Additionally, each of the plurality of DSL scripts PDS may be encrypted by means of one or more encryption techniques. Thus, prior to the card data translation, the first DSL interpreter 126 may be further configured to decrypt the encrypted first DSL script SC1.

The second smart card 114 may include a second memory 132, a second control circuit 134, and a second DSL interpreter 136 to perform the translation of the second card data CD2. The second memory 132, the second control circuit 134, and the second DSL interpreter 136 may operate in a similar manner as the first memory 122, the first control circuit 124, and the first DSL interpreter 126, respectively.

The smart card environment 100 is shown to include two service providers, two service provider devices, and two smart cards to make the illustrations concise and clear and should not be considered a limitation of the present disclosure. In various other embodiments, the smart card environment 100 may include more than two service providers, more than two service provider devices, and more than two smart cards, without deviating from the scope of the present disclosure.

Although FIG. 1 illustrates two card aggregator circuitries, with each aggregating the plurality of smart cards, the scope of the present disclosure is not limited to it. In various other embodiments, a single card aggregator circuitry or more than two card aggregator circuitries, each aggregating multiple smart cards may be implemented, without deviating from the scope of the present disclosure.

The first smart card 112 is shown to be linked to a single service provider (e.g., the first service provider 104) in FIG. 1 to make the illustration concise and clear and should not be considered a limitation of the present disclosure. The first smart card 112 may be linked to two or more service providers, without deviating from the scope of the present disclosure. In other words, the same smart card (e.g., the first smart card 112) may be utilized for availing the services of two or more service providers. The second smart card 114 may similarly be linked to two or more service providers, without deviating from the scope of the disclosure.

Figure 2:
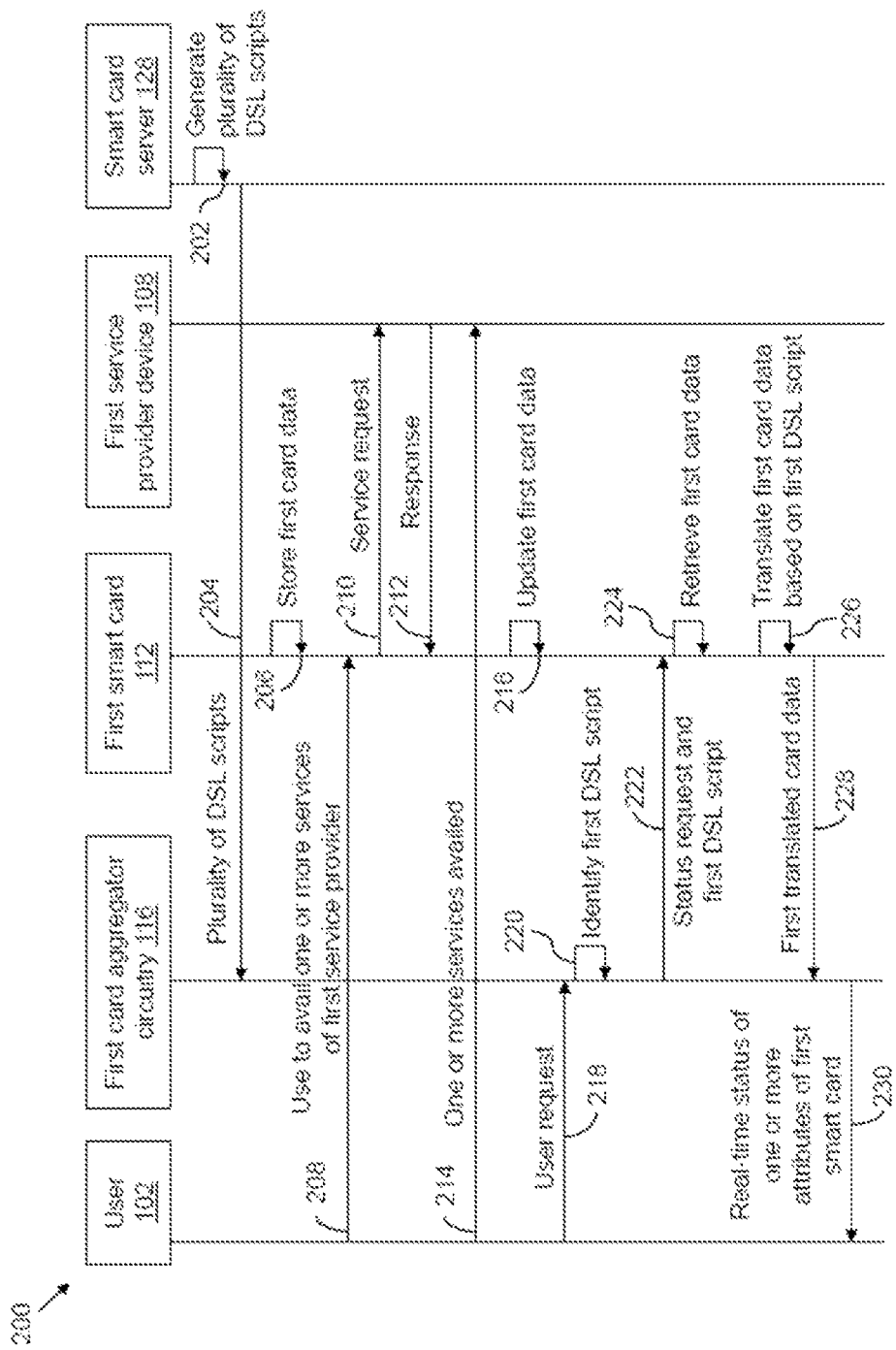
FIG. 2 represents a sequence diagram that illustrates the presentation of smart card data to a user of the smart card environment of FIG. 1 in accordance with an embodiment of the present disclosure.

FIG. 2 represents a sequence diagram 200 that illustrates the presentation of the smart card data to the user 102 in accordance with an embodiment of the present disclosure.

The smart card server 128 may generate the plurality of DSL scripts PDS (as shown by arrow 202). Each DSL script may be generated for card data translation from a format of a service provider (e.g., the first service provider 104) to a format of card aggregator circuitry (e.g., the first card aggregator circuitry 116). The plurality of DSL scripts PDS may be stored in the smart cards or the card aggregator circuitries. For the sake of ongoing description of FIG. 2, it is assumed that the plurality of DSL scripts PDS is stored in the card aggregator circuitries. Thus, the smart card server 128 may store the plurality of DSL scripts PDS in the first card aggregator circuitry 116 (as shown by arrow 204). In such a scenario, each DSL script of the plurality of DSL scripts PDS may be generated to enable data translation from a format of one of the plurality of service providers (e.g., the first and second service providers 104 and 106) to the format of the first card aggregator circuitry 116. Further, the first smart card 112 (e.g., the first memory 122) may store the first card data CD1 that indicates the real-time status of the one or more attributes of the first smart card 112 (as shown by arrow 206).

The user 102 may use the first smart card 112 to avail the one or more services of the first service provider 104 (as shown by arrow 208). The first smart card 112 (e.g., the first control circuit 124) may communicate with the first service provider device 108 and initiate a service request (as shown by arrow 210). The first service provider device 108 may generate a response based on the first card data CD1 stored in the first smart card 112 to indicate whether the user 102 is allowed to avail the one or more services (as shown by arrow 212). When the response indicates that the user 102 is allowed (e.g., is successfully authenticated), the user 102 avails the one or more services (as shown by arrow 214). Based on the one or more services being availed by the user 102, the first smart card 112 (e.g., the first control circuit 124) may update the first card data CD1 (as shown by arrow 216). As the first card data CD1 is updated after each transaction (e.g., every time a service is availed by the user 102), the first card data CD1 is maintained up-to-date.

The user 102 may initiate the user request on the first card aggregator circuitry 116 (e.g., the user device 120) for the real-time status of the one or more attributes of the first smart card 112 (as shown by arrow 218). The first card aggregator circuitry 116 may identify, based on the user request being associated with the first service provider 104, the first DSL script SC1 from the plurality of DSL scripts PDS (as shown by arrow 220). The first card aggregator circuitry 116 may provide the first DSL script SC1 and the status request to the first smart card 112 (as shown by arrow 222). The first smart card 112 (e.g., the first DSL interpreter 126) may retrieve the first card data CD1 from the first memory 122 (as shown by arrow 224). Further, the first smart card 112 (e.g., the first DSL interpreter 126) may translate the first card data CD1 from the format of the first service provider 104 to the format of the first card aggregator circuitry 116 based on the first DSL script SC1 (as shown by arrow 226). The first smart card 112 (e.g., the first DSL interpreter 126) may provide the first translated card data TC1 to the first card aggregator circuitry 116 (as shown by arrow 228). As the first translated card data TC1 is in the format of the first card aggregator circuitry 116, the first card aggregator circuitry 116 may present, to the user 102, the real-time status of the one or more attributes of the first smart card 112 on the output component of the user device 120 (as shown by arrow 230).

The sequence diagram 200 describes the scenario where the plurality of DSL scripts PDS is stored in the card aggregator circuitries. In an alternate embodiment, the plurality of DSL scripts PDS may be stored in the smart cards. In such a scenario, the sequence diagram 200 may be modified such that the arrow 204 is terminated at the first smart card 112 and the identification of the first DSL script SC1 is executed by the first smart card 112 after the status request is received from the first card aggregator circuitry 116.

In the sequence diagram 200, the card data translation is triggered based on the user request. In other embodiments, the card data translation may be triggered based on the services being availed or at periodic time intervals. In such scenarios, the sequence diagram 200 may be modified such that the plurality of DSL scripts PDS may be stored in the smart cards, the identification of the first DSL script SC1 may be executed by the first smart card 112 based on the services being availed or at the periodic time intervals, and the first translated card data TC1 may be stored in the first card aggregator circuitry 116 for presentation to the user 102 when the user 102 initiates the user request.

FIGS. 3A-3G are diagrams that illustrate exemplary scenarios 300A-300G in which the smart card data is presented to the user 102 in accordance with an embodiment of the present disclosure. The exemplary scenarios 300A-300G are described in conjunction with the first smart card 112. For the sake of ongoing discussion, it is assumed that the user device 120 is a smartphone. Further, the first card aggregator circuitry 116 is embedded in the user device 120 such that the first card aggregator circuitry 116 may present a user interface (UI) on the user device 120. Additionally, the first smart card 112 is a virtual smart card and is installed on the user device 120.

Figure 3A:
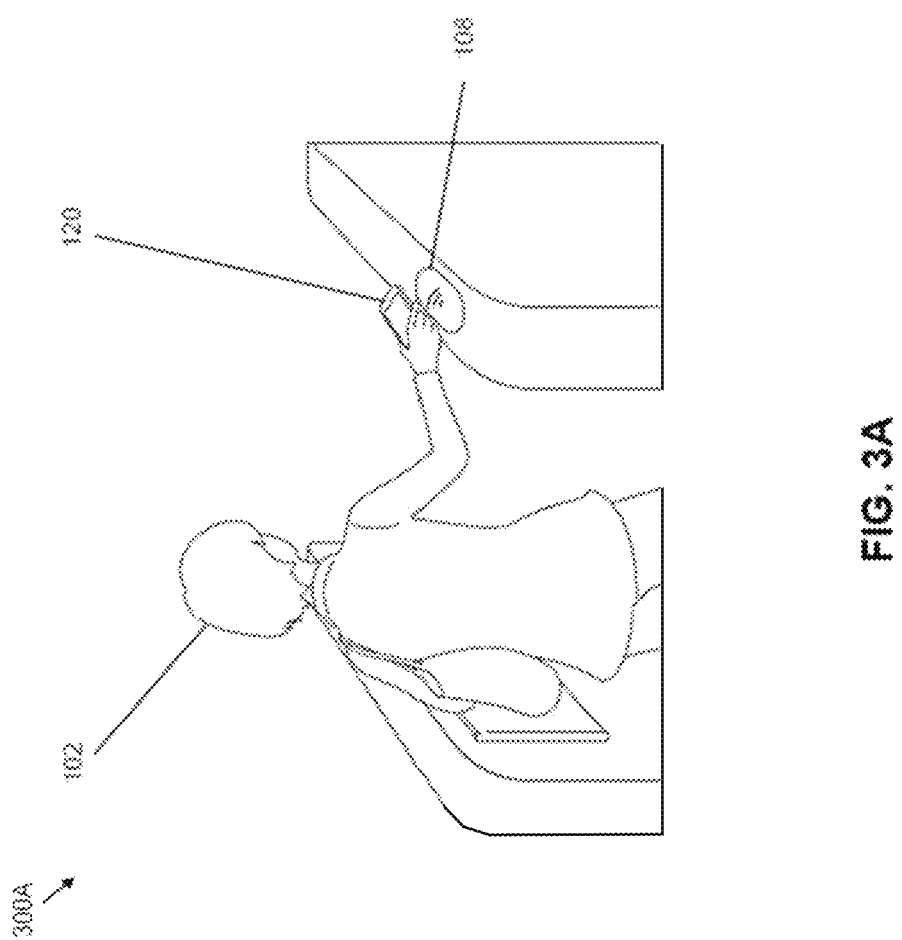

In the exemplary scenario 300A with regards to FIG. 3A, the user 102 wishes to avail the transportation service offered by the first service provider 104 (e.g., a city metro). The first service provider device 108 of the first service provider 104 may be integrated with an automated turnstile to enforce one-way movement and regulate the transportation service. As illustrated in FIG. 3A, the user 102 is present in the vicinity of the first service provider device 108. The user 102 places the user device 120 near the first service provider device 108. The first control circuit 124 of the first smart card 112 may communicate with the first service provider device 108, and the first service provider device 108 may authenticate the user 102 and authorize the transaction (e.g., purchase of a ticket for the transportation service). The user 102 may thus be allowed to pass through the turnstile and the first control circuit 124 may update the first card data CD1 to reflect the latest transaction.

The exemplary scenarios 300B-300G illustrate the different UIs presented on the output component (hereinafter referred to and designated as the "output component 302") of the user device 120 being held by the user 102. As illustrated in FIGS. 3B-3G, the output component 302 may correspond to a display unit.

Referring now to FIG. 3B, the exemplary scenario 300B illustrates a first UI 304a presented on the output component 302 of the user device 120. The first UI 304a is shown to include first and second options 306a and 306b (e.g., graphical user interface (GUI) elements 'A' and 'B'). The first and second options 306a and 306b are selectable GUI elements and are indicative of the virtual smart cards (e.g., the first and second smart cards 112 and 114, respectively) stored in the user device 120. For the sake of ongoing discussion, it is assumed that the user device 120 includes two virtual smart cards. However, if more than two smart cards are stored on the user device 120, the number of the GUI elements may vary depending on the number of virtual smart cards. Further, the first UI 304a is shown to include a first signal status 308a that is indicative of the availability of a mobile network to establish a connection with the smart card server 128.

Referring now to FIG. 3C, the exemplary scenario 300C illustrates the user 102 selecting the first option 306a (e.g., the GUI element 'A') from the two options available on the first UI 304a.

Figures 3D, 3E:
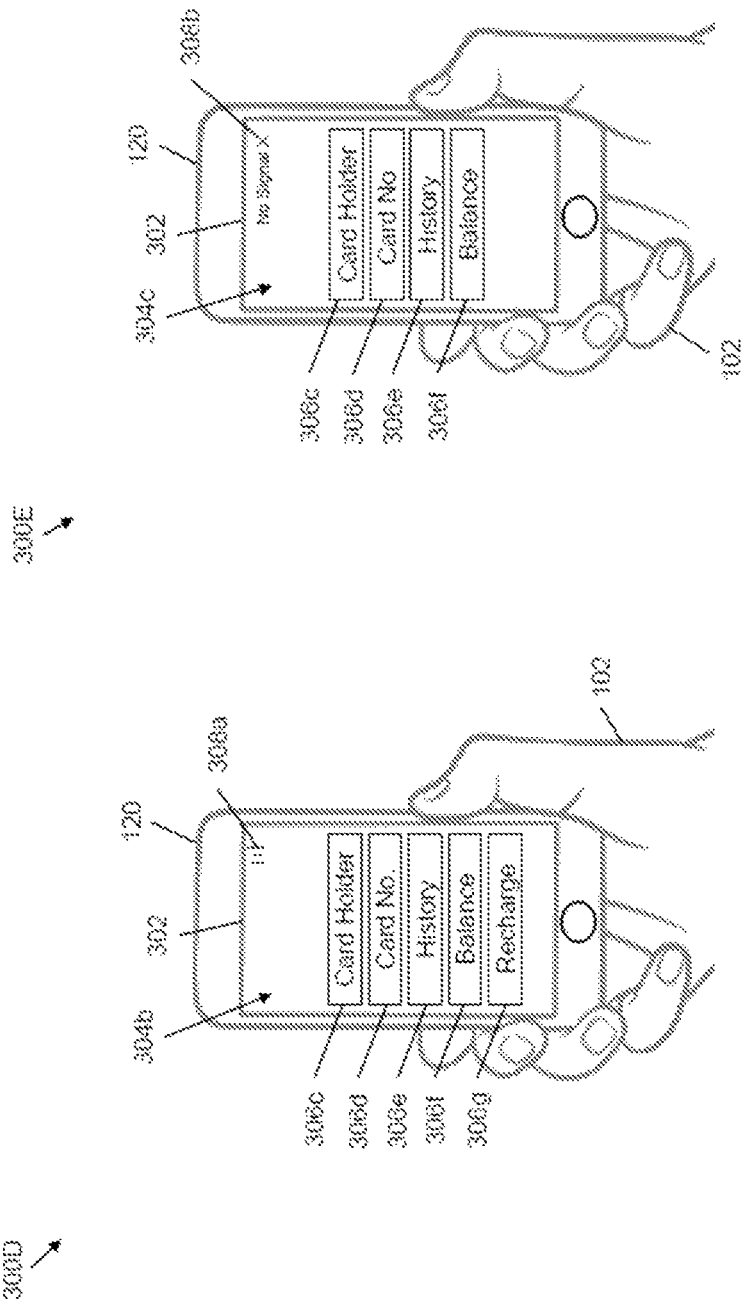

Referring now to FIG. 3D, the exemplary scenario 300D illustrates a second UI 304b presented on the output component 302 of the user device 120.

The second UI 304b is shown to include third through seventh options 306c-306g (e.g., GUI elements 'Card holder', 'Card No.', 'History', 'Balance', and 'Recharge'). These five options are selectable GUI elements and are further indicative of five options associated with the first smart card 112.

Referring now to FIG. 3E, the exemplary scenario 300E illustrates a third UI 304c presented on the user device 120. The third UI 304c includes a second signal status 308b that is indicative of the unavailability of the mobile network to establish a connection with the smart card server 128. The third UI 304c is thus shown to include exclusively the third through sixth options 306c-306f (e.g., the GUI elements 'Card holder', 'Card No.', 'History', and 'Balance'). These four options are selectable even in the absence of a mobile network.

Figure 3G:
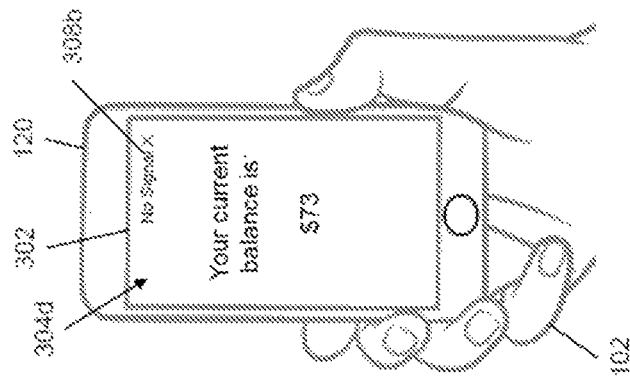
Figure 3F:
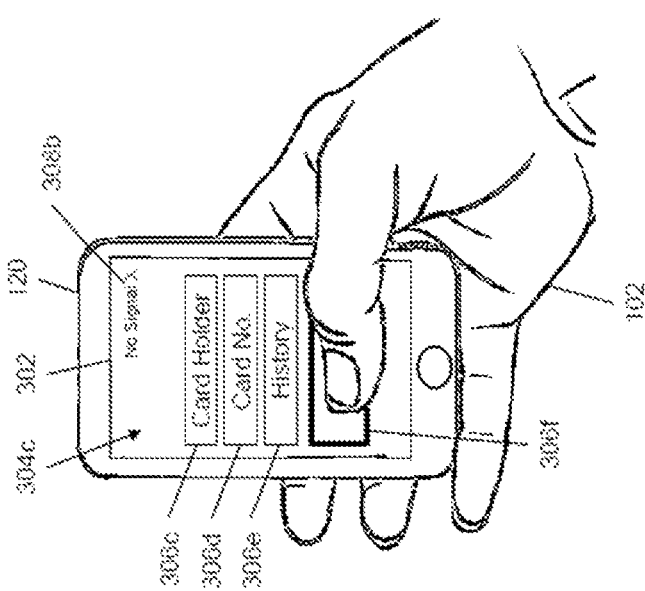

Referring now to FIG. 3F, the exemplary scenario 300F illustrates the user 102 selecting the sixth option 306f (e.g., the GUI element 'Balance') from the four options available on the third UI 304c.

Referring now to FIG. 3G, the exemplary scenario 300G illustrates a fourth UI 304d presented on the output component 302 of the user device 120. The fourth UI 304d displays the balance information of the first smart card 112. The user 102 may thus be able to view the balance information of the first smart card 112 in an offline environment and immediately after the transaction is completed (e.g., the service is availed). Thus, in the aforementioned exemplary scenario, the user 102 may view the balance information when the user 102 is in the metro traveling underground (e.g., where the mobile network is absent).

Other attributes of the first smart card 112 and the second smart card 114 may be presented to the user 102 in a similar manner as described above.

Figure 4:
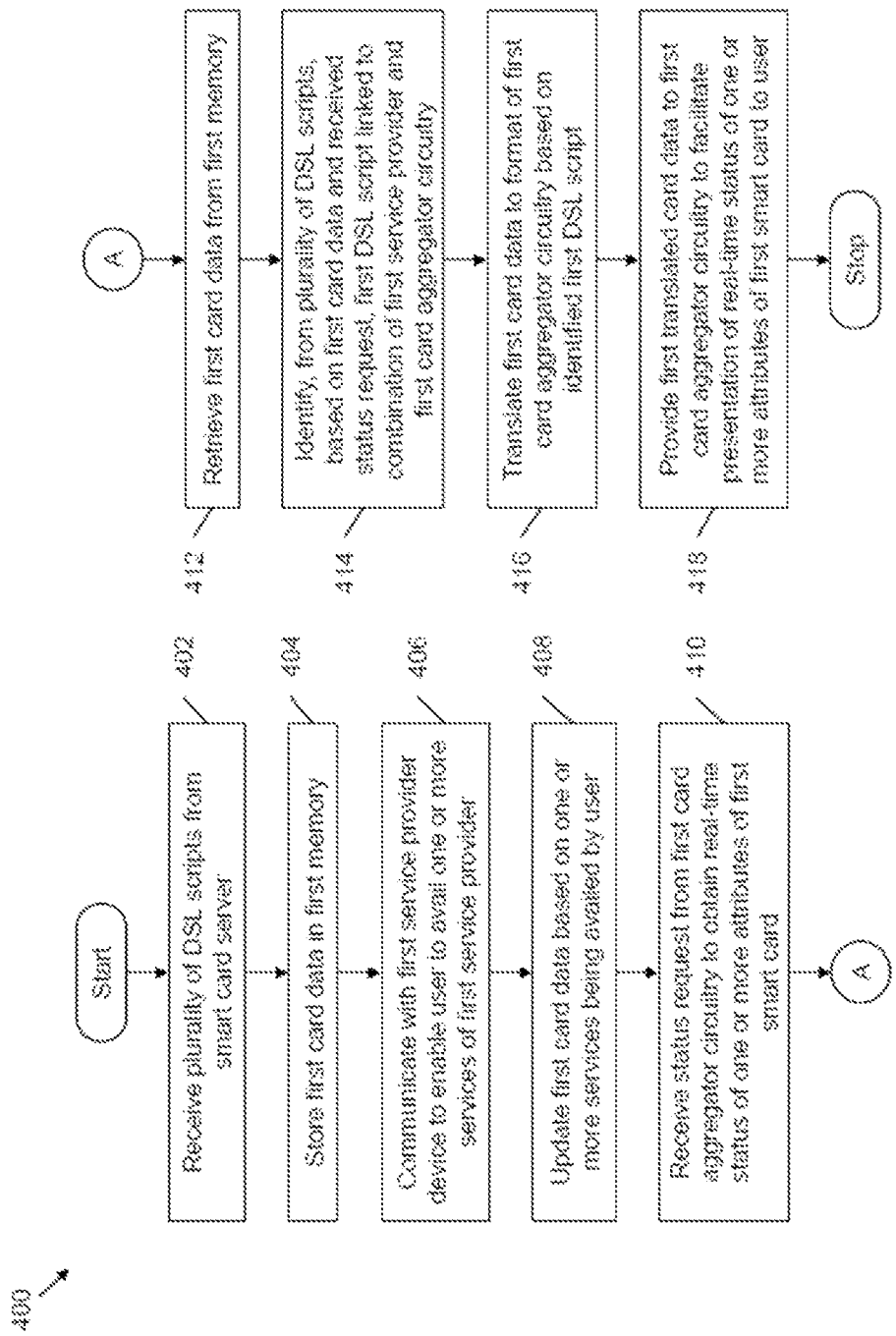
FIG. 4 represents a flowchart that illustrates a method for facilitating the presentation of the smart card data to the user in accordance with an embodiment of the present disclosure.

FIG. 4 represents a flowchart 400 that illustrates a method for facilitating the presentation of the smart card data to the user 102 in accordance with an embodiment of the present disclosure. The flowchart 400 describes the operations performed by the first smart card 112 to facilitate the presentation of the first card data CD1 to the user 102.

At step 402, the first memory 122 receives the plurality of DSL scripts PDS from the smart card server 128. In other words, the smart card server 128 stores the plurality of DSL scripts PDS in the first memory 122. In such a scenario, each DSL script is generated to enable data translation from the format of the first service provider 104 to a format of one of the card aggregator circuitries (e.g., the first and second card aggregator circuitries 116 and 118). At step 404, the first control circuit 124 may store the first card data CD1 in the first memory 122. The first card data CD1 may be stored in the format of the first service provider 104.

The user 102 may wish to avail the one or more services of the first service provider 104 by using the first smart card 112 at the first service provider device 108. Thus, at step 406, the first control circuit 124 may communicate with the first service provider device 108 to enable the user 102 to avail the one or more services of the first service provider 104. At step 408, the first control circuit 124 may update the first card data CD1 based on the one or more services being availed by the user 102. At step 410, the first DSL interpreter 126 may receive the status request from the first card aggregator circuitry 116 to obtain the real-time status of the one or more attributes of the first smart card 112. The status request may be received based on the user 102 requesting to view the real-time status of the one or more attributes of the first smart card 112.

At step 412, the first DSL interpreter 126 may retrieve the first card data CD1 from the first memory 122. At step 414, the first DSL interpreter 126 may identify, from the plurality of DSL scripts PDS, based on the first card data CD1 and the received status request, the first DSL script SC1 linked to the combination of the first service provider 104 and the first card aggregator circuitry 116. At step 416, the first DSL interpreter 126 may translate the first card data CD1 to the format of the first card aggregator circuitry 116 based on the identified first DSL script SC1. At step 418, the first DSL interpreter 126 may provide the first translated card data TC1 to the first card aggregator circuitry 116 to facilitate the presentation of the real-time status of the one or more attributes of the first smart card 112 to the user 102.

The flowchart 400 describes the scenario where the plurality of DSL scripts PDS is stored in the smart cards. In an alternate embodiment, the plurality of DSL scripts PDS may be stored in the card aggregator circuitries. In such a scenario, the flowchart 400 may be sans steps 402 and 414, and at step 410, the first smart card 112 (e.g., the first DSL interpreter 126) may receive the first DSL script SC1 in addition to the status request from the first card aggregator circuitry 116.

In the flowchart 400, the card data translation is triggered based on the user request. In other embodiments, the card data translation may be triggered based on the services being availed or at periodic time intervals. In such scenarios, the flowchart 400 may be sans step 410. Further, steps 412 and 414 may be triggered based on the services being availed or lapse of the periodic time interval. Additionally, the first translated card data TC1 may be stored in the first card aggregator circuitry 116 for presenting to the user 102 when the user 102 requests to view the real-time status of the one or more attributes of the first smart card 112.

FIGS. 1-4 describe a smart card being linked to at least one service provider and at least one card aggregator circuitry, and the smart card data being translated for presenting to the user 102 by way of the card aggregator circuitry. However, the scope of the disclosure is not limited to it. In other embodiments, the smart cards may be capable of presenting the smart card data to the user 102. An example of such a smart card is illustrated in FIG. 5.

Figure 5:
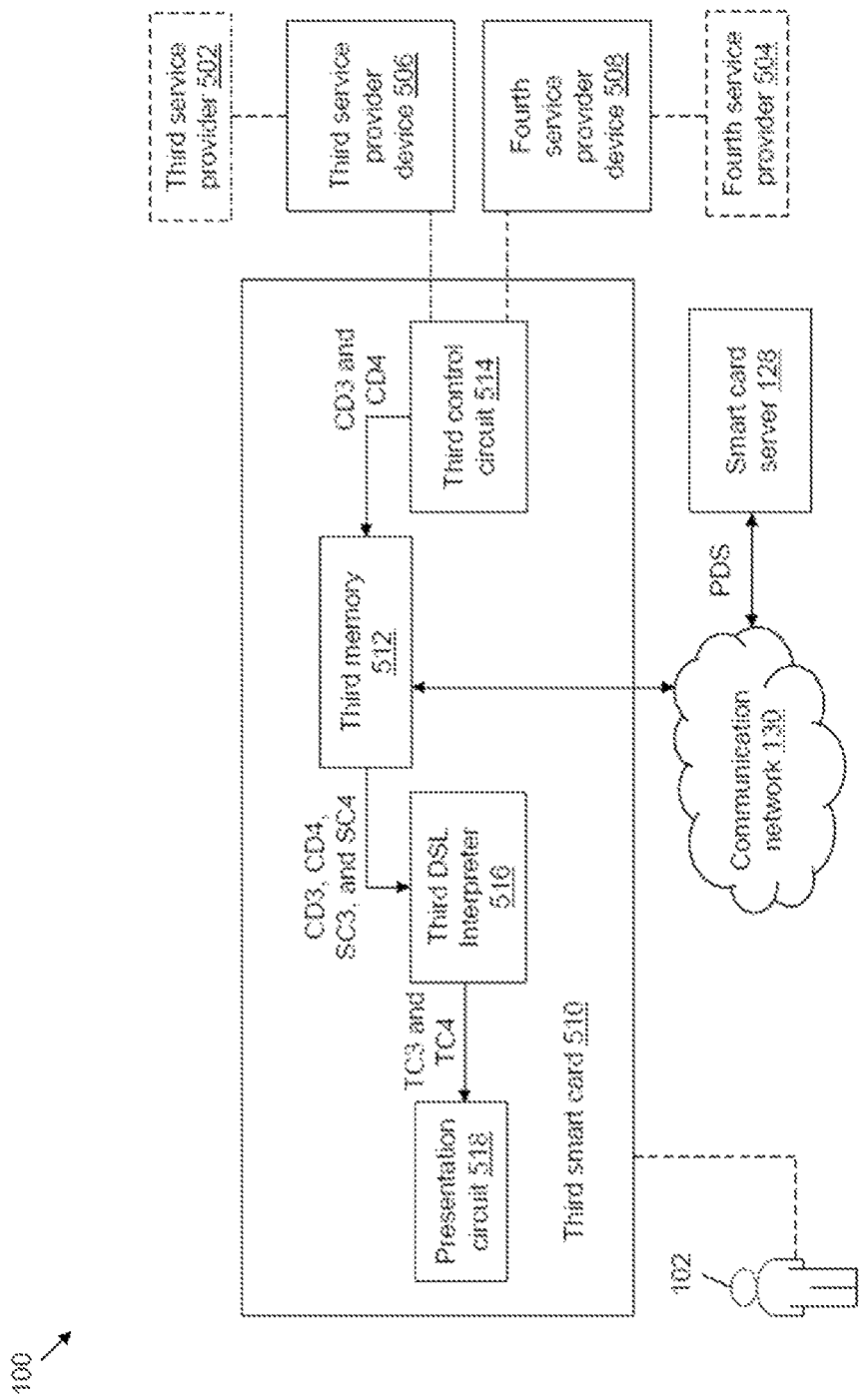
FIG. 5 illustrates a schematic diagram of the smart card environment in accordance with another embodiment of the present disclosure.

FIG. 5 illustrates a schematic diagram of the smart card environment 100 in accordance with another embodiment of the present disclosure. The smart card environment 100 of FIG. 5 may include the user 102, third and fourth service providers 502 and 504, third and fourth service provider devices 506 and 508 of the third and fourth service providers 502 and 504, respectively, a third smart card 510 linked to the third and fourth service providers 502 and 504, the smart card server 128, and the communication network 130.

The smart card environment 100 of FIG. 5 may be sans the card aggregator circuitries as the smart cards (e.g., the third smart card 510) may be capable of presenting the smart card data to the user 102. In such cases, the smart cards correspond to physical smart cards. Further, for the sake of simplicity, a single smart card linked to two service providers is shown. However, the smart card environment 100 of FIG. 5 may include multiple smart cards, each being linked to two or more service providers, without deviating from the scope of the present disclosure.

The third and fourth service providers 502 and 504 may be similar to the first service provider 104 and the third and fourth service provider devices 506 and 508 may be similar to the first service provider device 108. The third smart card 510 may be configured to store third card data CD3 and fourth card data CD4. The third and fourth card data CD3 and CD4 may indicate the real-time status of one or more attributes of the third smart card 510. For example, the third card data CD3 may indicate the real-time status of the one or more attributes of the third smart card 510 associated with the third service provider 502, and the fourth card data CD4 may indicate the real-time status of the one or more attributes of the third smart card 510 associated with the fourth service provider 504. To avail the services of the third and fourth service providers 502 and 504, the user 102 may use the third smart card 510 at the third and fourth service provider devices 506 and 508, respectively, in a similar manner as described above.

The third and fourth card data CD3 and CD4 stored in the third smart card 510 are in formats of the third and fourth service providers 502 and 504, respectively. To enable the presentation of the third card data CD3 to the user 102, the third smart card 510 may be further configured to translate the third card data CD3 from the format of the third service provider 502 to a format that is presentable to the user 102. The third card data CD3 is translated based on a third DSL script SC3 that is generated for data translation from the format of the third service provider 502 to the format that is presentable to the user 102. The third smart card 510 may be further configured to identify the third DSL script SC3 from the plurality of DSL scripts PDS generated for card data translation. The smart card server 128 may be coupled to the third smart card 510 by way of the communication network 130, and may be configured to generate the plurality of DSL scripts PDS and store the plurality of DSL scripts PDS in the third smart card 510 by way of the communication network 130. Each DSL script may be generated to enable data translation from the format of one service provider (such as the third and fourth service providers 502 and 504) to the format that is presentable to the user 102. The third smart card 510 may be similarly configured to translate the fourth card data CD4 from the format of the fourth service provider 504 to the format that is presentable to the user 102 based on a fourth DSL script SC4.

The third smart card 510 may thus generate third and fourth translated card data TC3 and TC4. Further, the third smart card 510 may be configured to present, based on the third and fourth translated card data TC3 and TC4, the real-time status of the one or more attributes of the third smart card 510 associated with the third and fourth service providers 502 and 504 to the user 102, respectively. The real-time status may be presented in a visual form, an audio form, an audio/visual form, a haptic form, or the like.

In the present disclosure, only the translation of the third card data CD3 is explained in detail. However, the fourth card data CD4 may be translated for presentation to the user 102 in a similar manner, without deviating from the scope of the present disclosure. To perform the card data translation, the third smart card 510 may include a third memory 512, a third control circuit 514, a third DSL interpreter 516, and a presentation circuit 518.

The third memory 512 may include suitable logic, circuitry, and/or interfaces that may be configured to perform one or more operations. For example, the third memory 512 may be configured to store the third and fourth card data CD3 and CD4 in the format of the third and fourth service providers 502 and 504, respectively. The third memory 512 may be further configured to store the plurality of DSL scripts PDS. In other words, the smart card server 128 may store the plurality of DSL scripts PDS in the third memory 512.

The third control circuit 514 may be coupled to the third memory 512. The third control circuit 514 may include suitable logic, circuitry, and/or interfaces that may be configured to perform one or more operations. For example, the third control circuit 514 may be configured to store the third and fourth card data CD3 and CD4 in the third memory 512. Further, the third control circuit 514 may be configured to communicate with the third service provider device 506 to enable the user 102 to avail the one or more services that are regulated by the third service provider device 506. The communication between the third control circuit 514 and the third service provider device 506 may be implemented in the contact and/or contactless manner as described above. Based on the one or more services being availed by the user 102, the third control circuit 514 may be further configured to update the third card data CD3. The third card data CD3 is thus maintained up-to-date.

The third DSL interpreter 516 may be coupled to the third memory 512. The third DSL interpreter 516 may include suitable logic, circuitry, and/or interfaces that may be configured to perform one or more operations. For example, the third DSL interpreter 516 may be configured to retrieve the third card data CD3 from the third memory 512. The third DSL interpreter 516 may be further configured to determine that the third card data CD3 is to be translated. Further, the third DSL interpreter 516 may be configured to identify, from the plurality of DSL scripts PDS, the third DSL script SC3 linked to the third service provider 502 and retrieve the third DSL script SC3 from the third memory 512. The third DSL interpreter 516 may be further configured to translate the third card data CD3 to the format that is presentable to the user 102 (e.g., generate the third translated card data TC3) based on the third DSL script SC3.

The card data translation may be triggered based on different factors. In one embodiment, the card data translation may be triggered based on the user request for the real-time status of the one or more attributes of the third smart card 510. For example, the user 102 may wish to view the real-time status of any attribute (e.g., balance information) of the third smart card 510 and may initiate the user request on the third smart card 510 (e.g., on the presentation circuit 518). In such a scenario, the third DSL interpreter 516 may be further configured to receive the user request to obtain the real-time status of the one or more attributes of the third smart card 510 associated with the third service provider 502. The third DSL interpreter 516 determines that the third card data CD3 is to be translated and translates the third card data CD3 in response to the received user request. In another embodiment, the third DSL interpreter 516 determines that the third card data CD3 is to be translated and translates the third card data CD3 in response to the one or more services being availed by the user 102 (e.g., each time a service is availed by the user 102) or at periodic time intervals. In both scenarios, the third translated card data TC3 may be stored in the third memory 512 and may be presented to the user 102 when the user 102 initiates the user request.

The third card data CD3, the plurality of DSL scripts PDS, and the third translated card data TC3 may be in the JSON format, the XML format, or the like. Additionally, each of the plurality of DSL scripts PDS is encrypted by means of one or more encryption techniques. Thus, prior to the card data translation, the third DSL interpreter 516 may be further configured to decrypt the encrypted third DSL script SC3.

The presentation circuit 518 may be coupled to the third DSL interpreter 516. The presentation circuit 518 may include suitable logic, circuitry, and/or interfaces that may be configured to perform one or more operations. For example, the presentation circuit 518 may be configured to present, to the user 102, a list (not shown) of the various service providers linked to the third smart card 510. Further, the user 102 may select a desired option from the list (e.g., initiate the user request) for triggering the data translation. The presentation circuit 518 may be further configured to provide the user request to the third DSL interpreter 516.

The presentation circuit 518 may be further configured to receive, in response to the user request, the third translated card data TC3 from the third DSL interpreter 516. As the third translated card data TC3 is in the format that is presentable to the user 102 (e.g., is in the format of the presentation circuit 518), the presentation circuit 518 may be further configured to present, to the user 102 based on the third translated card data TC3, the real-time status of the one or more attributes of the third smart card 510 associated with the third service provider 502. In an exemplary embodiment, the presentation circuit 518 corresponds to a display unit presenting the real-time status of the one or more attributes of the third smart card 510 to the user 102 in the visual form. However, the scope of the present disclosure is not limited to it. In other embodiments, the presentation circuit 518 may be implemented in different ways for presenting the real-time status of the one or more attributes of the third smart card 510 to the user 102 in different forms (such as the audio form, the audio/visual form, the haptic form, or the like).

The fourth card data CD4 may be translated and presented to the user 102 in a similar manner as described above.

Although it is described that exclusively the smart card data associated with one service provider is presented at a time, the scope of the present disclosure is not limited to it. In other embodiments, smart card data associated with multiple service providers may be presented to the user 102, without deviating from the scope of the present disclosure.

Thus, in the present disclosure, the DSL interpreter (e.g., the first through third DSL interpreters 126, 136, and 516) is included in the smart card (e.g., the first through third smart cards 112, 114, and 510) to translate the smart card data (e.g., the first through fourth card data CD1-CD4) to the format that is presentable to the user 102. The translation is executed in an offline manner, and the user device 120 is not required to be connected to the Internet to view the smart card data. In other words, the user 102 may view the card data in the absence of network connectivity, and the challenges of poor internet connectivity or network congestion are eliminated. Additionally, as the card data stored in the smart card is directly used for presenting to the user 102, the data presented to the user 102 is up-to-date. As a result, the user experience of the user 102 is significantly improved as compared to conventional techniques where the card data is fetched from the servers of service providers via the Internet.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

SUMMARY

In an embodiment of the present disclosure, the first smart card 112 is disclosed. The first smart card 112 may include the first memory 122 and the first DSL interpreter 126. The first memory 122 may be configured to store the first card data CD1 that indicates the real-time status of the one or more attributes of the first smart card 112. The first smart card 112 may be linked to the first service provider 104 and enables the user 102 to avail the one or more services of the first service provider 104. Further, the first card data CD1 may be stored in the format of the first service provider 104. The first DSL interpreter 126 may be configured to translate the first card data CD1 to the format of the first card aggregator circuitry 116. The first card data CD1 may be translated based on the first DSL script SC1 that is generated for data translation from the format of the first service provider 104 to the format of the first card aggregator circuitry 116. The first smart card 112 may be further linked to the first card aggregator circuitry 116 and based on the first translated card data TC1, the real-time status of the one or more attributes of the first smart card 112 is presented to the user 102 by way of the first card aggregator circuitry 116.

In another embodiment of the present disclosure, a method for facilitating the presentation of the first card data CD1 to the user 102 is disclosed. The method may include storing the first card data CD1 in the first memory 122 of the first smart card 112, by the first control circuit 124 of the first smart card 112. The first smart card 112 may be linked to the first service provider 104 and the first card data CD1 may be stored in the format of the first service provider 104. The method may further include communicating, by the first control circuit 124, with the first service provider device 108 of the first service provider 104 to enable the user 102 of the first smart card 112 to avail the one or more services of the first service provider 104 that are regulated by the first service provider device 108. Further, the method may include updating, by the first control circuit 124, the first card data CD1 based on the one or more services being availed by the user 102 such that the first card data CD1 may indicate the real-time status of the one or more attributes of the first smart card 112. The method may also include retrieving the first card data CD1 from the first memory 122 and translating the first card data CD1 to the format of the first card aggregator circuitry 116, by the first DSL interpreter 126 of the first smart card 112. The first card data CD1 may be translated based on the first DSL script SC1 that is generated to enable data translation from the format of the first service provider 104 to the format of the first card aggregator circuitry 116. Further, the method may include providing, by the first DSL interpreter 126, the first translated card data TC1 to the first card aggregator circuitry 116. Based on the first translated card data TC1, the real-time status of the one or more attributes of the first smart card 112 may be presented to the user 102 by way of the first card aggregator circuitry 116.

In some embodiments, the first smart card 112 may further include the first control circuit 124 that may be configured to communicate with the first service provider device 108 of the first service provider 104 to enable the user 102 to avail the one or more services that are regulated by the first service provider device 108.

In some embodiments, the first control circuit 124 may be coupled to the first memory 122, and may be further configured to update the first card data CD1 based on the one or more services being availed by the user 102.

In some embodiments, the first DSL interpreter 126 may be further configured to provide the first translated card data TC1 to the first card aggregator circuitry 116 to facilitate the presentation of the real-time status of the one or more attributes of the smart card to the user 102.

In some embodiments, the first DSL interpreter 126 may translate the first card data CD1 and provide the first translated card data TC1 to the first card aggregator circuitry 116 in response to the one or more services being availed by the user 102.

In some embodiments, the first DSL interpreter 126 may translate the first card data CD1 and provide the first translated card data TC1 to the first card aggregator circuitry 116 at periodic time intervals.

In some embodiments, the one or more attributes of the first smart card 112 may include at least one of a group consisting of user data, details of a current transaction, balance information, transaction history, reward points information, and accessible zones in an establishment.

In some embodiments, the first memory 122 may be further configured to store the plurality of DSL scripts PDS, with each DSL script being generated to enable data translation from the format of the first service provider 104 to a format of one of a plurality of card aggregator circuitries. The plurality of card aggregator circuitries may include the first card aggregator circuitry 116.

In some embodiments, the first DSL interpreter 126 may be coupled to the first memory 122. The first DSL interpreter 126 may be configured to receive, from the first card aggregator circuitry 116, a status request to obtain the real-time status of the one or more attributes of the first smart card 112. The first DSL interpreter 126 may be further configured to retrieve the first card data CD1 from the first memory 122. Based on the first card data CD1 and the received status request, the first DSL interpreter 126 may be further configured to identify, from the plurality of DSL scripts PDS, the first DSL script SC1 linked to the combination of the first service provider 104 and the first card aggregator circuitry 116. The first card data CD1 may be translated based on the identified first DSL script SC1. Additionally, the first DSL interpreter 126 may be further configured to provide, in response to the received status request, the first translated card data TC1 to the first card aggregator circuitry 116 to facilitate the presentation of the real-time status of the one or more attributes of the first smart card 112 to the user 102.

In some embodiments, the first DSL interpreter 126 may receive the status request in response to the user request for the real-time status of the one or more attributes of the first smart card 112.

In some embodiments, the DSL script may be identified from the plurality of DSL scripts based on a mapping between the plurality of DSL scripts and the plurality of card aggregator circuitries.

In some embodiments, the first DSL script SC1 may be encrypted. The first DSL interpreter 126 may be further configured to decrypt the encrypted first DSL script SC1 prior to the translation of the first card data CD1.

In some embodiments, the first DSL interpreter 126 may be further configured to retrieve the first card data CD1 from the first memory 122. Further, the first DSL interpreter 126 may be configured to receive, from the first card aggregator circuitry 116, the first DSL script SC1 and the status request to obtain the real-time status of the one or more attributes of the first smart card 112. The first DSL interpreter 126 may translate the first card data CD1 based on the received first DSL script SC1. The first DSL interpreter 126 may be further configured to provide, in response to the received status request, the first translated card data TC1 to the first card aggregator circuitry 116 to facilitate the presentation of the real-time status of the one or more attributes of the first smart card 112 to the user 102.

In some embodiments, the first DSL script SC1 received from the first card aggregator circuitry 116 is one of the plurality of DSL scripts PDS, with each DSL script being generated to enable data translation from the format of one of the plurality of service providers to the format of the first card aggregator circuitry 116. The plurality of service providers may include the first service provider 104.

In some embodiments, the first DSL script SC1 may be identified from the plurality of DSL scripts PDS based on the mapping between the plurality of DSL scripts PDS and the plurality of service providers.

In some embodiments, the first DSL interpreter 126 may receive the status request and the first DSL script SC1 in response to the user request for the real-time status of the one or more attributes of the first smart card 112.

In yet another embodiment of the present disclosure, the third smart card 510 is disclosed. The third smart card 510 may include the third memory 512, the third DSL interpreter 516, and the presentation circuit 518. The third memory 512 may be configured to store the third card data CD3 that indicates the real-time status of the one or more attributes of the third smart card 510. The third smart card 510 may be linked to the third service provider 502 and enables the user 102 to avail the one or more services of the third service provider 502. The third card data CD3 may be stored in the format of the third service provider 502. The third DSL interpreter 516 may be coupled to the third memory 512, and configured to retrieve the third card data CD3 from the third memory 512. The third DSL interpreter 516 may be further configured to translate the third card data CD3 to the format that is presentable to the user 102. The third card data CD3 may be translated based on the third DSL script SC3 that is generated for data translation from the format of the third service provider 502 to the format that is presentable to the user 102. The presentation circuit 518 may be coupled to the third DSL interpreter 516, and may be configured to receive the third translated card data TC3 from the third DSL interpreter 516 and present, based on the third translated card data TC3, the real-time status of the one or more attributes of the third smart card 510 to the user 102.

In some embodiments, the third smart card 510 may further include the third control circuit 514 that may be coupled to the third memory 512. The third control circuit 514 may be configured to communicate with the third service provider device 506 of the third service provider 502 to enable the user 102 to avail the one or more services that are regulated by the third service provider device 506. The third control circuit 514 may be further configured to update the third card data CD3 based on the one or more services being availed by the user 102.

In some embodiments, the third DSL interpreter 516 may be further configured to receive the user request to obtain the real-time status of the one or more attributes of the third smart card 510. Further, the third DSL interpreter 516 translates the third card data CD3 in response to the received user request.

In some embodiments, the third memory 512 may be further configured to store the plurality of DSL scripts PDS, with each DSL script being generated to enable data translation from a format of one of the third and fourth service providers 502 and 504 to the format that is presentable to the user 102. The third DSL interpreter 516 may be further configured to identify, from the plurality of DSL scripts PDS, based on the third card data CD3 and the received user request, the third DSL script SC3 linked to the third service provider 502. The third card data CD3 may be translated based on the identified third DSL script SC3.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. A smart card, comprising:
    a memory configured to store card data that indicates a real-time status of one or more attributes of the smart card, wherein the smart card is linked to a service provider and enables a user to avail one or more services of the service provider, and wherein the card data is stored in a format of the service provider; and
    a domain-specific language (DSL) interpreter configured
        to translate the card data to a first format of first card aggregator circuitry, resulting in first translated card data, wherein the card data is translated to the first translated card data based on a first DSL script that is generated for data translation from the format of the service provider to the format of the first card aggregator circuitry,
        to provide the first translated card data to the first card aggregator circuitry to facilitate, based on the first translated card data, presentation of the real-time status of the one or more attributes of the smart card to the user by way of the first card aggregator circuitry,
        to translate the card data to a second format of second card aggregator circuitry, resulting in second translated card data, wherein the card data is translated to the second translated card data based on a second DSL script that is different from the first DSL script, wherein the second DSL script is generated for data translation from the format of the service provider to the format of the second card aggregator circuitry, and
        to provide the second translated card data to the second card aggregator circuitry to facilitate, based on the second translated card data, presentation of the real-time status of the one or more attributes of the smart card to the user by way of the second card aggregator circuitry.

2. The smart card of claim 1, further comprising a control circuit configured to communicate with a service provider device of the service provider to enable the user to avail the one or more services that are regulated by the service provider device.

3. The smart card of claim 2, wherein the control circuit is coupled to the memory, and wherein the control circuit is further configured to update the card data based on the one or more services being availed by the user.

4. The smart card of claim 1, wherein the DSL interpreter is further configured to provide the first translated card data to the first card aggregator circuitry in response to the one or more services being availed by the user.

5. The smart card of claim 1, wherein the DSL interpreter is further configured to provide the first translated card data to the first card aggregator circuitry at periodic time intervals.

6. The smart card of claim 1, wherein the one or more attributes of the smart card comprise at least one of a group consisting of (i) user data, (ii) details of a current transaction, (iii) balance information, (iv) transaction history, (v) reward points information, and (vi) accessible zones in an establishment.

7. The smart card of claim 1, wherein the memory is further configured to store a plurality of DSL scripts, including the first DSL script and the second DSL script, with each DSL script being generated to enable data translation from the format of the service provider to a format of one of a plurality of card aggregator circuitries, and wherein the plurality of card aggregator circuitries comprises the first card aggregator circuitry and the second card aggregator circuitry.

8. The smart card of claim 7, wherein the DSL interpreter is coupled to the memory, and further configured to:
   receive, from the first card aggregator circuitry, a status request to obtain the real-time status of the one or more attributes of the smart card;
   retrieve the card data from the memory;
   identify, from the plurality of DSL scripts, based on the card data and the received status request, the first DSL script linked to a combination of the service provider and the first card aggregator circuitry, wherein the card data is translated based on the first DSL script; and
   provide, in response to the received status request, the first translated card data to the first card aggregator circuitry to facilitate the presentation of the real-time status of the one or more attributes of the smart card to the user.

9. The smart card of claim 8, wherein the DSL interpreter receives the status request in response to a user request for the real-time status of the one or more attributes of the smart card.

10. The smart card of claim 1, wherein the first DSL script is encrypted, and wherein the DSL interpreter is further configured to decrypt the encrypted DSL script prior to the translation of the card data.

11. The smart card of claim 1, wherein the DSL interpreter is coupled to the memory, and further configured to:
   receive, from the first card aggregator circuitry, the first DSL script and a status request to obtain the real-time status of the one or more attributes of the smart card;
   retrieve the card data from the memory, wherein the DSL interpreter translates the card data based on the received first DSL script; and
   provide, in response to the received status request, the first translated card data to the first card aggregator circuitry to facilitate the presentation of the real-time status of the one or more attributes of the smart card to the user.

12. The smart card of claim 11, wherein the first DSL script received from the first card aggregator circuitry is one of a plurality of DSL scripts, with each DSL script being generated to enable data translation from a format of one of a plurality of service providers to the format of the first card aggregator circuitry, wherein the plurality of service providers comprises the service provider, and wherein the first DSL script is identified from the plurality of DSL scripts based on a mapping between the plurality of DSL scripts and the plurality of service providers.

13. The smart card of claim 11, wherein the DSL interpreter receives the status request and the first DSL script in response to a user request for the real-time status of the one or more attributes of the smart card.

14. A smart card, comprising:
   a memory configured to
      store card data that indicates a real-time status of one or more attributes of the smart card, wherein the smart card is linked to a service provider and enables a user to avail one or more services of the service provider, and wherein the card data is stored in a format of the service provider, and
      store a plurality of DSL scripts, with each DSL script being generated to enable data translation from the format of the service provider to a format of one of a plurality of card aggregator circuitries, wherein the plurality of card aggregator circuitries comprises a first card aggregator circuitry, and wherein the plurality of DSL scripts includes a first DSL script that is generated for data translation from the format of the service provider to the format of the first card aggregator circuitry; and
   a domain-specific language (DSL) interpreter coupled to the memory and configured to
      receive, from the first card aggregator circuitry, a status request to obtain the real-time status of the one or more attributes of the smart card,
      retrieve the card data from the memory,
      identify, from the plurality of DSL scripts, based on the card data and the received status request, the first DSL script linked to a combination of the service provider and the card aggregator circuitry, wherein the first DSL script is identified from the plurality of DSL scripts based on a mapping between the plurality of DSL scripts and the plurality of card aggregator circuitries,
      translate the card data to a format of the first card aggregator circuitry, wherein the card data is translated based on the first DSL script, and wherein the smart card is further linked to the first card aggregator circuitry, and
      provide, in response to the received status request, the translated card data to the first card aggregator circuitry to facilitate the presentation to the user, by way of the first card aggregator circuitry, of the real-time status of the one or more attributes of the smart card to the user based on the translated card data.

15. A smart card that is configured to be linked to a first service provider to enable a user to avail one or more services of the first service provider, and configured to be linked to a second service provider to enable the user to avail one or more services of the second service provider, the smart card comprising:
   a memory configured
      to store a first DSL script that enables data translation from a format of the first service provider to a format that is presentable to a user, to store a second DSL script that enables data translation from a format of the second service provider to the format that is presentable to a user, to store first card data that indicates a real-time status of one or more first attributes of the smart card, wherein the first card data is stored in a format of the first service provider, and to store second card data that indicates a real-time status of one or more second attributes of the smart card, wherein the second card data is stored in a format of the second service provider;

a domain-specific language (DSL) interpreter that is coupled to the memory, and configured to receive a first user request to obtain the real-time status of the one or more first attributes of the smart card, to identify, based on the first user request, the first DSL script linked to the first service provider, to retrieve the first card data from the memory in response to the received first user request, and to translate the first card data to the format that is presentable to the user, resulting in first translated card data, wherein the first card data is translated based on the first DSL script that is generated for data translation from the format of the first service provider to the format that is presentable to the user; and a presentation circuit that is coupled to the DSL interpreter, and configured to receive the first translated card data from the DSL interpreter and present, based on the first translated card data, the real-time status of the one or more first attributes of the smart card to the user.

16. The smart card of claim 15, further comprising a control circuit that is coupled to the memory, and configured to:

communicate with a service provider device of the first service provider to enable the user to avail the one or more services that are regulated by the service provider device; and update the card data based on the one or more services being availed by the user.

17. The smart card of claim 15, wherein the one or more first attributes of the smart card comprise at least one of a group consisting of (i) user data, (ii) details of a current transaction, (iii) balance information, (iv) transaction history, (v) reward points information, and (vi) accessible zones in an establishment.

18. The smart card of claim 15, wherein the DSL interpreter is further configured to receive a second user request to obtain the real-time status of the one or more second attributes of the smart card, to identify, based on the second user request, the second DSL script linked to the second service provider, to retrieve the second card data from the memory in response to the received second user request, and to translate the second card data in response to the received second user request to the format that is presentable to the user, resulting in second translated card data, wherein the second card data is translated based on the second DSL script.

19. A method, comprising:

storing, by a control circuit of a smart card, in a memory of the smart card, card data associated with the smart card, wherein the smart card is linked to a service provider and the card data is stored in a format of the service provider;

communicating, by the control circuit, with a service provider device of the service provider to enable a user of the smart card to avail one or more services of the service provider that are regulated by the service provider device;

updating, by the control circuit, the card data based on the one or more services being availed by the user such that the card data indicates a real-time status of one or more attributes of the smart card;

retrieving, by a domain-specific language (DSL) interpreter of the smart card, the card data from the memory;

translating, by the DSL interpreter, the card data to a first format of first card aggregator circuitry, resulting in first translated card data, wherein the card data is translated to the first translated card data based on a first DSL script that is generated to enable data translation from the format of the service provider to the format of the first card aggregator circuitry;

providing, by the DSL interpreter, the first translated card data to the first card aggregator circuitry to facilitate, based on the first translated card data, presentation of the real-time status of the one or more attributes of the smart card to the user by way of the first card aggregator circuitry, translating, by the DSL interpreter, the card data to a second format of second card aggregator circuitry, resulting in second translated card data, wherein the card data is translated to the second translated card data based on a second DSL script that is different from the first DSL script, wherein the second DSL script is generated for data translation from the format of the service provider to the format of the second card aggregator circuitry, and providing, by the DSL interpreter, the second translated card data to the second card aggregator circuitry to facilitate, based on the second translated card data, presentation of the real-time status of the one or more attributes of the smart card to the user by way of the second card aggregator circuitry.

* * * * *